April 21, 1964     J. H. DEASY     3,129,812
PACKAGED FLANGED COUPLING ADAPTER ASSEMBLY
Filed April 17, 1961     3 Sheets-Sheet 1

4 "TEE" BOLTS WITH NUTS AND
4 "CROSS" BOLTS WITH NUTS
WRAPPED IN PAPER

8 "TEE" BOLTS WITH NUTS WRAPPED IN PAPER

INVENTOR.
JOHN H. DEASY
BY
ATTY.

April 21, 1964  J. H. DEASY  3,129,812
PACKAGED FLANGED COUPLING ADAPTER ASSEMBLY
Filed April 17, 1961
3 Sheets-Sheet 2
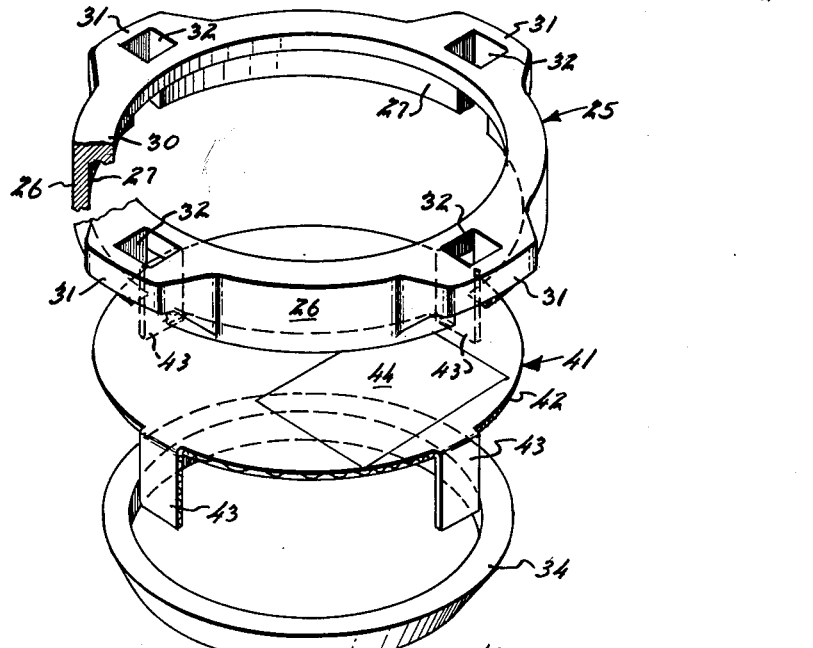
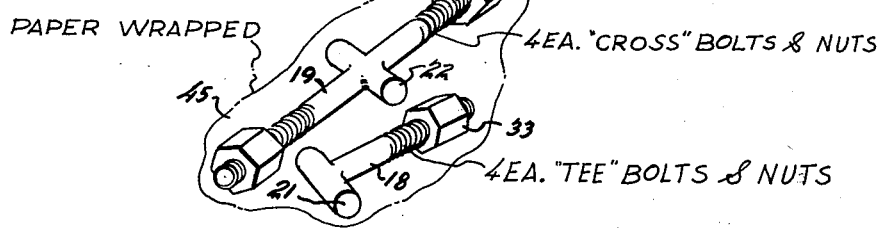
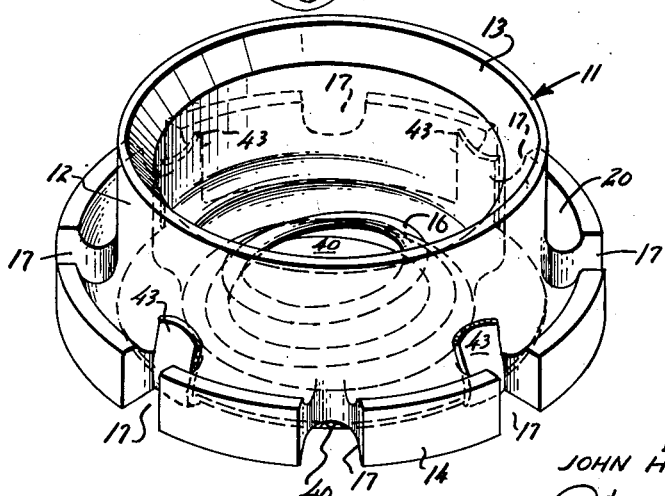
INVENTOR.
JOHN H. DEASY
BY
ATTY.

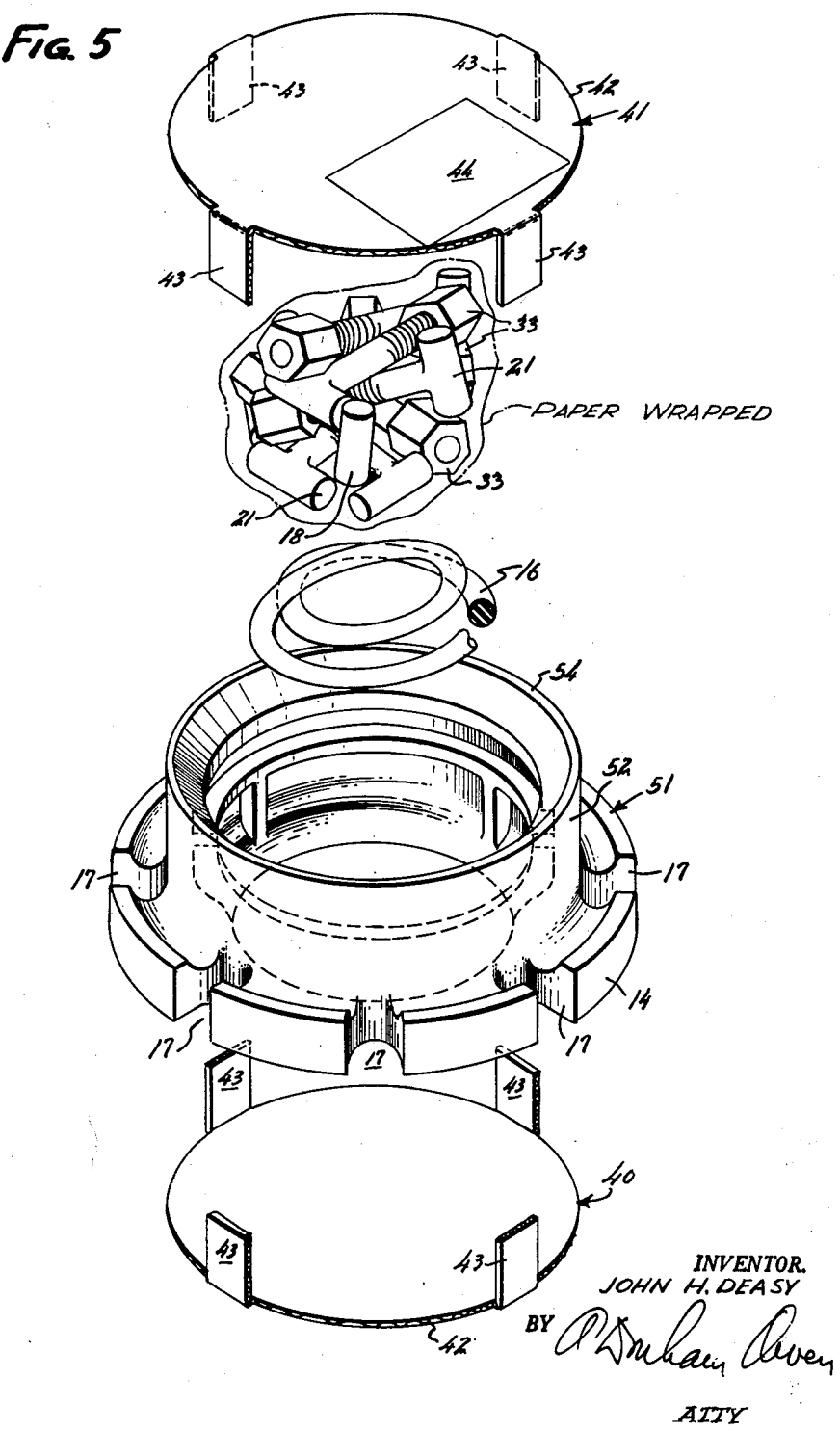

United States Patent Office 3,129,812
Patented Apr. 21, 1964

3,129,812
PACKAGED FLANGED COUPLING
ADAPTER ASSEMBLY
John H. Deasy, Daly City, Calif., assignor to Smith-Blair, Inc., South San Francisco, Calif., a corporation of California
Filed Apr. 17, 1961, Ser. No. 103,451
1 Claim. (Cl. 206—47)

This invention relates to a packaged flanged coupling adapter assembly and to a method of packaging flanged coupling adapters.

Flanged coupling adapters embody one or two castings, one or two gaskets, and usually about eight bolts and eight to twelve nuts, in each complete unit. Heretofore they have been shipped either as a number of loose pieces in several boxes or bundled together in whatever way was convenient and left to the customer to sort out, or they have been shipped as completely assembled units with the bolts tightened into place. In the latter alternative the end gasket could not be held in place and had either to be tied to the assembly, put loosely inside it, or shipped in a separate package. If shipped tied to the assembly, it was very liable to be damaged, and if put loosely inside the assembly or shipped separately, it was liable to get lost. One common form of adapter assembly includes two castings and two gaskets; this unit, when shipped assembled, had to have all its twelve or more nuts fully tightened on the bolts in order that the gasket between the castings not be chewed up while the assembly was en route, and this meant that the customer had to take apart all the bolts and nuts before he could install the unit.

Thus, the customer was put to inconvenience in any event. If the unit was shipped fully assembled, the customer had to disassemble it before he could use it, and the disassembly took time and was an annoyance; if the parts were shipped disassembled, he had to pick out the proper assortment of parts for each unit and be sure that he had them all when he went out to a particular job.

Similarly, the manufacturer had to be careful that he shipped all the needed parts, and if he shipped them assembled, it always took considerable time to pack each assembly together and was therefore expensive.

One object of this invention is to provide a very convenient package assembly for shipping and storing flanged coupling adapters and for enabling them to be brought to the job ready to install, taking the package apart only on the job.

Another object of the invention is to increase the efficiency and convenience for all of the manufacturer, the shipper, and the customer by providing all the parts for each unit in one convenient package. Moreover, the invention provides protection for the gaskets against damage and guards against the loss or misplacement of bolts and nuts. There is a great benefit for the manufacturer in having one complete unit available for shipment, because then he does not have to send anybody to his stock bins to locate and assemble all the parts. The parts can be assembled in advance and stored ready for shipment.

Another object of the invention is to save money by reducing the total cost of assembling and shipping units.

Other objects and advantages of the invention will appear from the following description of some preferred forms of the invention.

In the drawings:

FIG. 2 is an exploded view in perspective of the elements of the package, omitting only the metal straps which secure the package together. A portion of the follower is broken away and shown in section.

FIG. 5 is a view similar to FIG. 2 showing the assembly of the flanged coupling adapter of FIG. 4. A gasket is broken away and shown in section.

Figure 4:
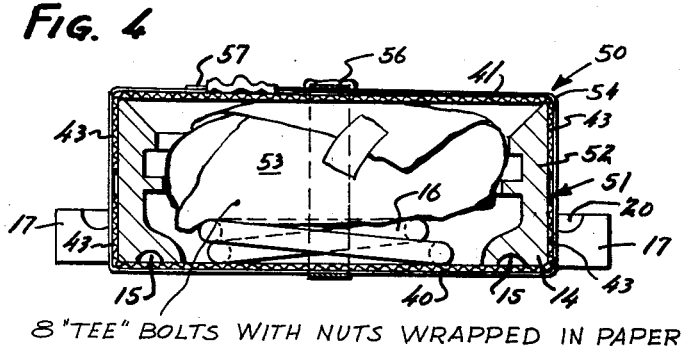
FIG. 4 is a view similar to FIG. 1 of a modified form of package for a modified type of flanged coupling adapter.
Figure 3:
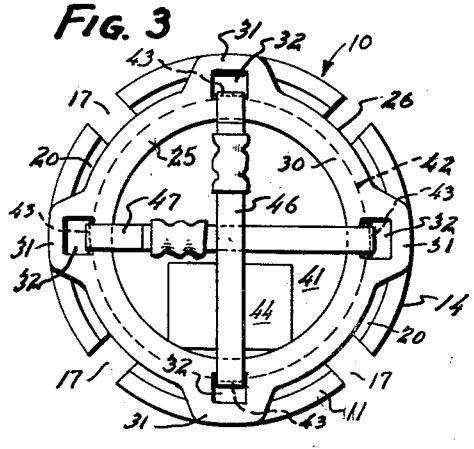
FIG. 3 is a top plan view of the completed package of FIGS. 1 and 2.

Flanged coupling adapters embodying the present invention are described in the patent application by Telford L. Smith and Thomas L. Graham, Serial Number 776,025, filed November 24, 1958, and will be described here only so far as they relate to the assembled package. There are two forms, of which one is used with common cast iron pipe and other kind of smooth-wall pipe, this form requiring the application of a follower and is shown in the package 10 of FIGS. 1 to 3. The other form of flange adapter is that shown in the package 50 of FIGS. 4 and 5 and is designed primarily for use with machined-end cement asbestos pipe; in this second form of the invention the coupling adapter needs to supply only one casting and one gasket, another gasket being supplied with the cement asbestos pipe. Due to the absence of the follower and this extra gasket there is some difference in detail in the packaging but the general principles are the same.

Figure 1:
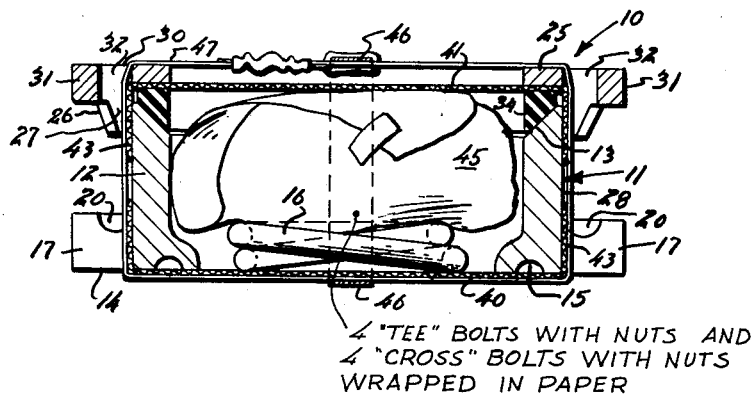
FIG. 1 is a view in elevation and partly in section of a packaged flanged coupling adapter assembly embodying the principles of the invention.

The flange adapter of FIGS. 1 and 2 comprises a casting 11 having a sleeve portion 12 with a frusto-conical gasket seat 13 at one end and a flange 14 at the other end. The flange 14 is preferably of the type shown in application Serial Number 776,025, filed November 24, 1958, by Telford L. Smith and Thomas L. Graham and has an annular recess 15 in its face that is adapted to receive an O-ring type of gasket 16 that is compressed between the flange adapter and the flange (not shown here). There may also be other recesses in the flange 14 to lighten its weight, but these do not affect the present invention. The flange 14 also has a series of slots 17 extending radially inwardly from its outer periphery; in these slots 17 bolts 18 and 19 will be installed when the adapter is assembled and installed. On its back face, the flange 14 has an annular recess 20 in which T and cross members 21, 22 of the bolts 18 and 19 fit for alignment and retention thereof.

The adapter of FIGS. 1 and 2 also includes a follower 25, a separate casting with a cylindrical portion 26 whose inner periphery 27 is greater than the outer periphery 28 of the sleeve 12, and an end 30 formed to provide a series of lugs 31 with enclosed bolt openings 32. There may be as many bolt openings 32, and lug members 31, all integral with the follower 25, as there are slots 17 in the flange 14, but a preferable construction is to have eight slots 17 in the flange 14 and only four holes 32 and lugs 31 in the follower 25. Then upon assembly, four cross bolts 19 are used to extend through both the slots 17 and the openings 32, and four T bolts 18 are used to extend through the slots 17 but not through the openings 32. All bolts 18 and 19 are secured by nuts 33 to the flange (not shown) when they are installed, and the nuts are expected to be provided with the assembly; moveover, the cross bolts 19 are provided with a second set of nuts 33 for securing them at the follower 25, so that all together, in this form of the invention, there are two castings 11 and 25, two gaskets 16 and 34, one for the face recess 15 and the other one for the gasket seat 13, four T bolts 18, four cross bolts 19, and twelve nuts 33, all of which must be included in the package 10. It will be appreciated that if the unit is shipped fully assembled, all twelve nuts 33 must be secured tightly on their bolts 18 and 19, and the user will have to unscrew all twelve nuts 33 before he can start installing the assembly; also he will have to find the gasket 16, which cannot be shipped in place. If it is put inside the member 11, as it often is, it tends to become lost, and if it is tied on, the string tends to cut it; in fact, there are many other ways in which it can be damaged or lost when handled according to prior-art shipping methods.

Figure 7:
FIG. 7 is a view in elevation of the closure member of FIG. 6.
Figure 6:
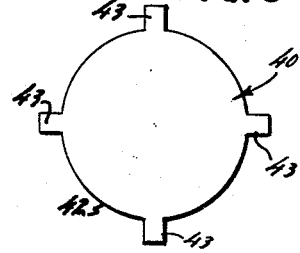
FIG. 6 is a plan view of one of the two closure members used in each package.

In this invention I employ a pair of closure members 40 and 41 (FIGS. 6 and 7) which may be considered as circular discs 42 with radially outwardly projecting integral tabs 43. These disc-like members may be cut from a single piece of stiff material such as sheet metal or corrugated cardboard, the latter usually being preferable. The size of the circular area 42 is preferably the same size as the outer periphery 20 of the sleeve 12. The tabs 43 are of sufficient length to extend through the slots 17.

The package 10 itself will probably best be understood by describing the way in which it is put together as seen in FIGS. 1 and 2, some reference to FIG. 5 being helpful even during this description, since most of the elements are quite similar, and since that figure shows some of the parts in different positions.

Two closure members 40 and 41 are used, on one (41) of which a label 44 or some other suitable indicia is placed. The closure member may also have the label printed on it. The unlabeled member 40 is installed on the flanged end 14 of the flanged coupling adapter 11. For this purpose the adapter 11 may be inverted so that the flange 14 is on top; then the closure member 40 may be placed on it, its tabs 43 aligned with suitable pairs of diametrically opposite slots 17, and then the tabs 43 are bent over. It will be assumed for the moment that there are four tabs 43 on the closure member 40 and that there are eight slots 17, although these numbers may be varied somewhat. After the tabs 43 have been bent up into the slots 17, the adapter 11 may be inverted to rest on the bottom closure member 40, the flange face being down.

The gasket 16 which fits on the face is a simple O-ring gasket and is easily folded into a kind of figure-eight configuration shown in FIG. 5 and FIG. 2 and placed inside the flange adapter 11, resting on the closure member 40. Then a paper-wrapped package 45 containing four T bolts 18, four cross bolts 19, and twelve nuts 33 may be inserted into the flange adapter 11. If desired, the paper wrapping may be omitted, and the order of insertion may be changed. Then the follower gasket 34 is placed on its seat 13 and over it is placed the second closure member 41, label 44 up. The tabs 43 on the closure member 41 are then bent over and aligned with the tabs 43 on the closure member 40. On top of the member 41 is placed the follower 25, its openings 32 being aligned with the tabs 43 on both closure members 40 and 41 and therefore with the slots 17 in the flange adapter 11.

All that remains then is to run a pair of metal bands 46 and 47 or other type of bending material, i.e., fiberglass or filament tape, paper back filament tape, wire, etc., across between diametrically opposite openings 32, along over the tabs 43 of the member 41, through the slots 17 over the tabs 43 of the member 40, and across the closure member 40, and the ends of each of the bands 46 and 47 are secured together. The bands 46 and 47 are 90° apart. Then the package 10 is complete. Everything that will be needed is part of the package or inside it. There is no need for an extra member to enclose the sides of the flange adapter 11 or the follower 25. The metal straps 46 and 47 and the closure members 40 and 41 provide a means for holding the assembly together and also for protecting it from the metal straps. At the same time there is provided an adequate fool-proof closure for retaining the contents (i.e., the gasket 16, the bolts 18 and 19, and the nuts 33) inside the package 10. The gasket 34 is protected by the closure member 25 and the adapter 11 being held tightly in place by the straps 46 and 47.

In the other form of flange adapter package 50 (FIGS. 4 and 5), an adapter 51 also has the flange 14 with its annular recess 15 for the O-ring gasket 16. There is no follower, and the adapter 51 has a sleeve 52 with a different interior construction that utilizes a gasket (not shown) supplied with machined cement asbestos pipe. This form of package 50 is also begun by placing one closure member 40 to cover the flanged end 14 of the adapter 51 as shown at the bottom of FIG. 5 (the adapter 51 is usually inverted at this time, and the member 40 is put on from above), the tabs 43 being bent into the slots 17. Then the gasket 16 and a package 53 of the eight T bolts 18 and eight nuts 33 is placed inside the adapter 51. Next the other closure member 41 is placed, label 44 up, on top of the other end 54 of the sleeve 52, and its tabs 43 are bent over and aligned with the tabs 43 of the other closure member 40 and therefore with the slots 17. Then bands 55 and 56 are installed in place and fastened, as before, as shown in the drawing.

It will be evident from the preceding description that very convenient packages 10 and 50 are obtained which are easily stored, either by the manufacturer or by the customer, which can be taken out by the manufacturer from his storage bins at any time shipment is needed without having to count out any of the individual parts and without having to actually assemble the complete device and tighten the nuts. Moreover, when it is used by the customer all he needs to do is cut the two bands 46, 47 or 56, 57 and the package then comes apart. The nuts and bolts are ready for assembly, without having to remove them from the slots 17 and bolt openings 32.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A packaged flanged coupling adapter assembly, including in combination:

(a) a one-piece flange-adapter having a cylindrical sleeve with an integral flange at one end and a frusto-conical gasket seat at the other end, said flange having a face with an annular gasket-receiving recess, a periphery with more than two pairs of radially inwardly extending diametrically opposite slots, and a rear side having an annular bolt-head receiving recess;

(b) a first gasket seated in said frusto-conical gasket seat;

(c) a pair of stiff, flat, end-closure members each shaped with a circular disc portion having diametrically opposite pairs of radially outwardly extending tabs, said disc portion being substantially the same outer periphery as said sleeve, a first said closure member being seated over said first gasket and the gasket-seat end of said sleeve with its tabs bent axially toward said flange and aligned with but spaced axially from some selected said slots, a second said closure member being seated over said flange face with its tabs bent axially into said selected slots;

(d) a second gasket for insertion in said gasket-receiving recess, folded and located inside said sleeve between said closure members;

(e) a package of bolts and nuts, one each for each slot, inside said sleeve between said closure members;

(f) a follower having an axially extending tubular cylindrical portion with an inner periphery larger than the outer periphery of said sleeve and end lug portions providing bolt openings alignable in diametrically opposite pairs with some of the pairs of said slots and at substantially the same radius, said follower being placed over said first closure member with its bolt openings aligned with said tabs of said closure members; and (g) a plurality of closed straps passing around said packaged assembly, passing across said first closure member and crossing each other there, passing through the bolt openings of said follower and over said tabs of said first closure member, through the slots over the tabs of said second closure member and across said second closure member there, crossing each other there, whereby a complete package is provided containing all the parts needed for assembly and providing a compact and easily handled unit.

References Cited in the file of this patent

UNITED STATES PATENTS

| | | |
|---|---|---|
| 1,355,042 | Harwood | Oct. 5, 1920 |
| 2,400,197 | Grodin | May 14, 1946 |
| 2,886,172 | Hodges | May 12, 1959 |

FOREIGN PATENTS

| | | |
|---|---|---|
| 767,765 | Great Britain | Feb. 6, 1957 |